P. WINEMAN.
HORSESHOE NAILS.

No. 180,181. Patented July 25, 1876.

Witnesses:
L. Van Riswick.
O. G. Stuart

Inventor:
Parker Wineman

UNITED STATES PATENT OFFICE.

PARKER WINEMAN, OF ROCK ISLAND, ILLINOIS.

IMPROVEMENT IN HORSESHOE-NAILS.

Specification forming part of Letters Patent No. 180,181, dated July 25, 1876; application filed February 8, 1876.

*To all whom it may concern:*

Be it known that I, PARKER WINEMAN, of Rock Island, in Rock Island county, and State of Illinois, have invented certain Improvements in Horseshoe-Nails, of which the following is a specification:

My invention relates to horseshoe-nails; and the invention consists in making the body of the nail oval in its cross-section, with extended and thinned edges, so that the nail will enter the hoof like a wedge without tearing or rupturing its substance, as is the case with the rectangular or flattened nail having wide sides heretofore in use.

Figure 1:
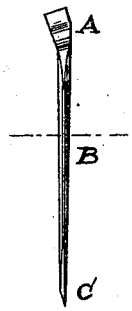
Figure 2:

In the accompanying drawings, Figure 1 is a side elevation of a horseshoe-nail embodying my invention. Fig. 2 is a cross-section through the body of the same.

Referring to the parts by letters, A represents the head, B the body, and C the point, of a horseshoe-nail. The body portion B is made oval in its cross-section, with extended and thinned edges. It will be seen that the thinnest portion of the metal is at the sides of the nail, so that it will operate like a double-ended wedge, and when driven into the hoof will not fracture or tear its substance.

These nails I prefer to coat with tin or other non-corrosive alloy or compound, so as to prevent injury to the horse's foot through the oxidation of the nails.

Having now described my invention, what I claim as new, and desire to secure by Letters Patent, is—

A horseshoe-nail, made as described, oval in its cross-section, and with its edges thinned off, substantially as and for the purpose specified.

PARKER WINEMAN.

Witnesses:
THOS. H. HUTCHINS,
F. P. FORD.